United States Patent
Hartz et al.

(10) Patent No.: US 10,757,182 B2
(45) Date of Patent: Aug. 25, 2020

(54) CONTEXTUALLY INTERACTING WITH APPLICATIONS

(71) Applicant: Microsoft Technology Licensing, LLC, Redmond, WA (US)

(72) Inventors: George E. Hartz, Windham, NH (US); David Fusari, Groton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 384 days.

(21) Appl. No.: 14/975,578

(22) Filed: Dec. 18, 2015

(65) Prior Publication Data
US 2016/0105497 A1    Apr. 14, 2016

Related U.S. Application Data

(62) Division of application No. 13/399,981, filed on Feb. 17, 2012, now Pat. No. 9,256,462.

(51) Int. Cl.
*G06F 9/48* (2006.01)
*H04L 29/08* (2006.01)
*H04L 12/18* (2006.01)

(52) U.S. Cl.
CPC .......... *H04L 67/104* (2013.01); *G06F 9/4843* (2013.01); *H04L 12/1822* (2013.01); *H04L 67/02* (2013.01); *H04L 67/34* (2013.01); *H04L 67/125* (2013.01)

(58) Field of Classification Search
CPC ..... H04L 12/1822; H04L 67/10; H04L 67/34; H04L 67/02; H04L 67/104; G06F 9/4843
See application file for complete search history.

(56) References Cited

U.S. PATENT DOCUMENTS

| | | | |
|---|---|---|---|
| 6,965,450 B2 | 11/2005 | Sweetland et al. | |
| 6,993,556 B1 | 1/2006 | Seliger et al. | |
| 7,849,498 B2 | 12/2010 | Royer et al. | |
| 7,873,710 B2 | 1/2011 | Kiley et al. | |
| 7,895,262 B2 | 2/2011 | Nielsen et al. | |
| 2002/0131065 A1* | 9/2002 | Sweetland ........... | G06K 15/007 358/1.13 |

(Continued)

FOREIGN PATENT DOCUMENTS

| | | |
|---|---|---|
| CN | 1574750 A | 2/2005 |
| CN | 1666199 A | 9/2005 |

(Continued)

OTHER PUBLICATIONS

English-language translation of Notice of Reason for Rejection dated Mar. 29, 2017 by the Japan Patent Office in corresponding Application No. JP 2014-557701.

(Continued)

*Primary Examiner* — Tuan C Dao

(57) ABSTRACT

The present discussion relates to contextually interacting with applications. One example can include a computer that has a set of applications installed thereon. This example can also include a URI manager configured to receive a context-defining URI, the URI manager can be configured to run a sub-set of the applications specified by the context-defining URI and to set a common context for the sub-set of the applications as specified by the context-defining URI.

10 Claims, 4 Drawing Sheets

(56) References Cited

U.S. PATENT DOCUMENTS

| | | | |
|---|---|---|---|
| 2004/0049544 A1* | 3/2004 | Kuroda | G06F 9/461 709/204 |
| 2005/0013462 A1* | 1/2005 | Rhoads | H04N 1/32144 382/100 |
| 2005/0091272 A1* | 4/2005 | Smith | H04L 51/28 |
| 2005/0108678 A1* | 5/2005 | Goodwin | G06F 8/20 717/100 |
| 2005/0137910 A1 | 6/2005 | Rao et al. | |
| 2006/0075224 A1 | 4/2006 | Tao | |
| 2006/0106648 A1 | 5/2006 | Esham et al. | |
| 2006/0123011 A1 | 6/2006 | Stillion et al. | |
| 2007/0027866 A1* | 2/2007 | Schmidt-Karaca | G06F 16/14 |
| 2007/0136433 A1* | 6/2007 | Booton | H04L 29/06027 709/213 |
| 2007/0174815 A1 | 7/2007 | Chrysanthakopoulos et al. | |
| 2008/0172649 A1* | 7/2008 | Bisso | G06F 8/65 717/121 |
| 2008/0183826 A1 | 7/2008 | Notani | |
| 2008/0201118 A1 | 8/2008 | Luo | |
| 2008/0201401 A1 | 8/2008 | Pugh et al. | |
| 2008/0215755 A1 | 9/2008 | Farber et al. | |
| 2008/0320328 A1* | 12/2008 | O'Leary | G06F 21/57 714/25 |
| 2009/0055924 A1 | 2/2009 | Trotter | |
| 2009/0070209 A1* | 3/2009 | Von Wolfsheild | G06Q 30/00 705/14.4 |
| 2009/0132632 A1 | 5/2009 | Jackson et al. | |
| 2009/0183182 A1* | 7/2009 | Parthasarathy | G06F 9/44568 719/321 |
| 2009/0327918 A1* | 12/2009 | Aaron | H04L 1/0009 715/751 |
| 2010/0235750 A1 | 9/2010 | Noland | |
| 2011/0131567 A1* | 6/2011 | Tirk | G06F 8/60 717/176 |
| 2011/0161419 A1 | 6/2011 | Chunilal | |
| 2011/0179113 A1 | 7/2011 | Thomas | |
| 2011/0276396 A1* | 11/2011 | Rathod | G06Q 10/00 705/14.49 |
| 2012/0036225 A1 | 2/2012 | Chor | |
| 2012/0070090 A1 | 3/2012 | Chang et al. | |
| 2012/0159395 A1* | 6/2012 | Deutsch | G06F 3/0481 715/835 |
| 2013/0125222 A1 | 5/2013 | Pravetz et al. | |
| 2015/0193215 A1* | 7/2015 | Jianu | G06F 8/61 717/177 |

FOREIGN PATENT DOCUMENTS

| | | |
|---|---|---|
| CN | 1667575 | 9/2005 |
| CN | 101779414 | 7/2010 |
| CN | 102243691 A | 11/2011 |
| EP | 1695532 A1 | 8/2006 |
| JP | 2009169969 A | 7/2009 |
| JP | 2010250386 A | 11/2010 |
| JP | 2011501834 A | 1/2011 |
| WO | 2005057891 A1 | 6/2005 |
| WO | WO2009139869 | 11/2009 |
| WO | WO2010037204 | 4/2010 |
| WO | 2011027492 A1 | 3/2011 |

OTHER PUBLICATIONS

The Chinese Office Action dated Jan. 10, 2017 for Chinese Patent Application No. 201380009925.6, a counterpart foreign application of U.S. Appl. No. 13/399,981.

The Extended European Search Report dated Apr. 26, 2016 for European Patent Application No. 13748486.1, 8 pages.

"Second Office Action Issued in Chinese Patent Application No. 201380009925.6", dated Jun. 19, 2017, 10 Pages.

"Office Action Issued in European Patent Application No. 13748486. 1", dated Jul. 27, 2017, 8 Pages.

"Notice of Allowance Issued in Japanese Patent Application No. 2014-557701", dated Dec. 14, 2017, 4 Pages.

"Notice of Allowance in Chinese Patent Application No. 201380009925. 6", dated Oct. 30, 2017, 4 Pages.

"Office Action Issued in Japanese Patent Application No. 2014-557701", dated Dec. 1, 2017, 7 Pages.

"Apache Tomcat Configuration Reference", Retrieved From http://tomcat.apache.org/tomcat-6.0-doc/config/context.html#Automatic_Context_Configuration, Retrieved Date: Nov. 30, 2011, 13 Pages.

"JBoss Web Web Application Deployment", Retrieved From http://docs.jboss.org/jbossweb/3.0.x/deployer-howto.html, Retrieved Date: Nov. 30, 2011, 3 Pages.

"Final Office Action Issued in U.S. Appl. No. 13/399,981", dated May 15, 2015, 25 Pages.

"Final Office Action Issued in U.S. Appl. No. 13/399,981", dated May 20, 2014, 16 Pages.

"Non Final Office Action Issued in U.S. Appl. No. 13/399,981", dated Nov. 14, 2014, 19 Pages.

"Non Final Office Action Issued in U.S. Appl. No. 13/399,981", dated Sep. 25, 2013, 13 Pages.

"International Search Report and Written Opinion Issued in PCT Application No. PCT/US13/25482", dated Apr. 29, 2013, 11 Pages.

Fandry, "Context Management, CCOW & HealthCare", Retrieved From <<http://fandry.blogspot.com/2009/11/context-management-ccow-healthcare.html>> Nov. 25, 2009, 5 Pages.

Clark, Kennedy, "Catalyst Manual Intro", Retrieved From https://metacpan.org/pod/release/BOBTFISH/Catalyst-Manual-5.9003/lib/Catalyst/Manual/Intro.pod, Retrieved Date: Nov. 30, 2011, 23 Pages.

"Office Action Issued in Korean Patent Application No. 10-2014-7022811", dated Jan. 9, 2019, 7 Pages.

"First Office Action and Search Report Issued in Chinese Patent Application No. 201810029392.2", dated Apr. 23, 2020, 17 pages.

* cited by examiner

CONTEXTUALLY INTERACTING WITH APPLICATIONS

CROSS-REFERENCE TO RELATED APPLICATIONS

This application is a continuation application and claims priority to U.S. patent application Ser. No. 13/399,981, filed Feb. 17, 2012, entitled "CONTEXTUALLY INTERACTING WITH APPLICATIONS," now issued U.S. Pat. No. 9,256,462, which application is incorporated herein by reference in its entirety.

BACKGROUND

Traditionally, computing scenarios involve users interacting with applications in isolation. More advanced scenarios involve multiple applications providing different functionalities relating to a common context. For example, a user, such as a clinician may utilize an imaging application and a records management application when diagnosing a patient. Context management systems can enable the lifecycle management of, and coordination of, disparate applications to a common context. The integration of applications into the common context is a complicated undertaking that tends to require a large amount of actions by the context management system and more notably, by the user.

SUMMARY

The present discussion relates to contextually interacting with applications. One example can include a computer that has a set of applications installed thereon. This example can also include a universal resource identifier (URI) manager configured to receive a context-defining URI. The URI manager configured to run a sub-set of the applications specified by the context-defining URI and to set a common context for the sub-set of the applications as specified by the context-defining URI.

Another example can receive information related to an entity. This example can generate a link, such as a context-defining URI, that specifies an application installed on a computer and a context for the application relating to the entity.

A further example can receive a context-defining URI that specifies an application to run and that defines a context for the application. This example can run the application and set the context of the application as defined by the context-defining URI.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

DETAILED DESCRIPTION

Overview

This patent relates to enabling application launching under a common context. More specifically, a universal resource identifier (URI) can be utilized to automatically launch one or more applications. The URI can also establish a common context for the applications simply by the user activating the URI. The inventive concepts can enable a web, or other applications, such as a portal website, to be able to launch an application and select a context without having a complicated integration.

System Examples

Figure 1:
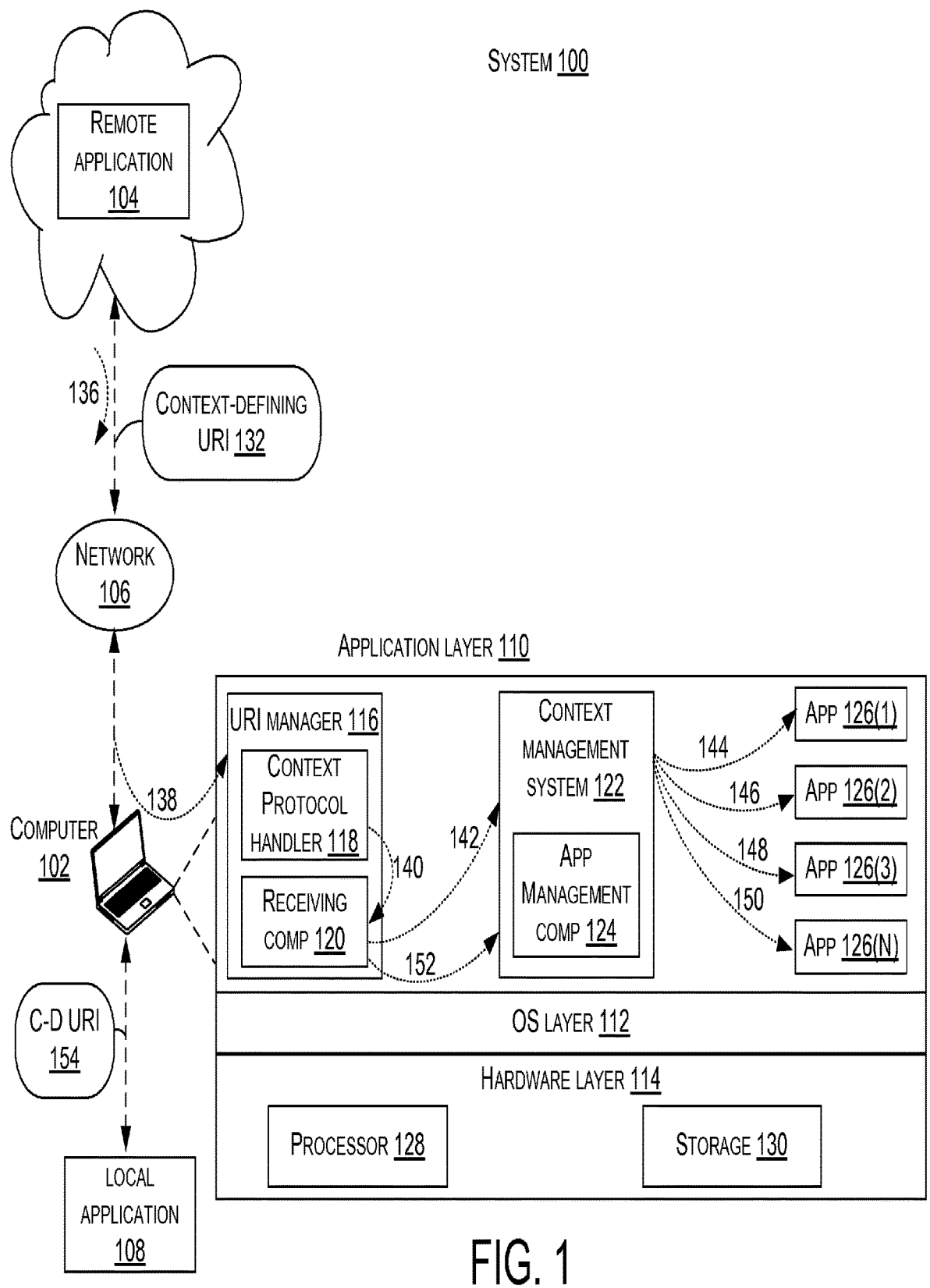
FIG. 1 shows a system upon which contextually interacting with application concepts can be employed in accordance with some implementations.

FIG. 1 shows a system 100 in which common context application launching can be implemented. In this case, system 100 includes a computer 102. The computer can communicate with a remote application 104, such as a web application or a web portal, via a network 106. Computer 102 can also include a local application 108 that will be described in more detail below.

For purposes of explanation computer 102 can be characterized as including an application layer 110 that operates upon an operating system layer 112 that operates upon a hardware layer 114. The application layer 110 can include a URI manager 116. The URI manager can include or interact with a context protocol handler 118 and a receiving component 120. The application layer 110 can also include a context management system 122 that can include or interact with an application management component 124. The application layer can also include a number of applications. For purposes of explanation four applications 126(1)-126(N) are illustrated (the suffix "N" signifies that any number of applications could be included). The hardware layer 114 can include a processor 128 and storage 130, as well as additional hardware components, such as input/output devices, buses, graphics cards, etc., which are not illustrated or discussed here for sake of brevity.

The URI manager 116 can be configured to manage URIs received by computer 102. The URI manager's context protocol handler 118 can be configured to handle URI schemes on the computer 102 and specifically to handle context-defining URIs on behalf of the URI manager. In some cases, the context protocol handler 118 can be manifest as a dynamic-link library (DLL) or executable registered to handle the context-defining URI.

Viewed from one perspective, the context protocol handler 118 can be configured to operate in an isolated security environment to read information from the context-defining URI. The context protocol handler can convey the information to the receiving component 120 that is configured to operate at a level of privilege that allows communication with a context management system and an application management system. In one case, the context protocol handler 118 can communicate a message containing information from the context-defining URI to receiving component 120. For instance, the information can relate to an application launch and/or context change information.

The receiving component 120 can be configured with sufficient privilege on computer 102 to be able to interact with the context management system 122 and/or the application management component 124. This configuration can allow the context protocol handler 118 to run in an isolated security environment. For example, in one instance the context protocol handler 118 may run in a protected mode of a graphical web browser, such as Internet Explorer®. The receiving component 120 can receive information from the context protocol handler 118 and can interact with the context management system 122 in order to trigger applications to securely launch.

The context management system 122 can be a mechanism for providing a shared state or context between a set of applications. The context management system can supply APIs that allows the applications to manipulate that shared state. For instance, the context management system can include APIs that inform the applications about changes to the context. Further, the context management system can include APIs that check with the various applications of the set to determine whether a particular context change is acceptable to the individual applications before the context change is actually implemented. For instance, if an individual application is already running in a different context and has unsaved data, changing the state may cause that unsaved data to be lost. The context management system can negotiate with the individual application to take actions to allow a safe context change. For example, the context management system can cause the application to save the present context of the individual application so that the application can safely change contexts to the context defined in the context-defining URI.

The application management component 124 can verify that taking a particular action relative to the shared context is allowed. For instance, in some cases, an administrator may have defined what actions are authorized and/or which actions are not authorized. The application management component can access this authorization information and ensure that only authorized actions are actually allowed and prohibited actions are not allowed to occur. In some cases, the receiving component 120 can operate cooperatively with the application management component 124 to ensure that a launch request from the context-defining URI matches an authorized action.

The term "computer" or "computing device" as used herein can mean any type of device that has some amount of processing capability and/or storage capability. Processing capability can be provided by one or more processors (such as processor 128) that can execute data in the form of computer-readable instructions to provide a functionality. Data, such as computer-readable instructions, can be stored on storage 130 that can be internal or external to the computer. The storage can include any one or more of volatile or non-volatile memory, hard drives, flash storage devices, and/or optical storage devices (e.g., CDs, DVDs etc.), among others. As used herein, the term "computer-readable media" can include transitory and non-transitory computer-readable instructions. In contrast, the term "computer-readable storage media" excludes transitory instances. Computer-readable storage media includes "computer-readable storage devices". Examples of computer-readable storage devices include volatile storage media, such as RAM, and non-volatile storage media, such as hard drives, optical discs, and flash memory, among others.

Examples of computing devices can include traditional computing devices, such as personal computers, cell phones, smart phones, personal digital assistants, or any of a myriad of ever-evolving or yet to be developed types of computing devices. Further, aspects of system 100 can be manifest on a single computing device or distributed over multiple computing devices. For instance, in the latter case computer 102 can act as a client device and operate cooperatively with a server computer over network 106. In another case, computer 102 may operate with cloud-based computing resources over network 106 and/or another network.

As introduced above, system 100 can enable common context application launching. In one such scenario, remote application 104 can generate context-defining URI 132 as indicated at 136. As will be explained below, when activated the context-defining URI 132 can cause one or more of applications 126(1)-126(N) to be run according to a context defined by the URI 132. For purposes of explanation, assume that context-defining URI 132 indicates to launch applications 126(1)-126(N) (or a sub-set thereof) and to set the context of each of these applications to hypothetical patient identification number 12345. For instance, assume that remote application 104 is running on a remote computer and is configured to process patient lab results. Assume further that remote application 104 is configured to provide notice to the patient's clinician whenever new lab results are ready. In one case, the remote application could generate a notification, such as an email that includes a template that reads "Dear Dr. _____: new lab results have been received for patient _____. Click on this link to automatically view the new lab results." The remote application can populate the first field with the requesting doctor's name (e.g., the doctor who requested the labs) and can populate the second field with the patient identification (e.g. 12345). Embedded within the link is the context-defining URI that can automatically open the applications and set the applications to patient identification 12345 when the clinician clicks the link.

In this configuration, the context-defining URI 132 is received at computer 102 by URI application manager 116 as indicated at 138. The URI manager's context protocol handler 118 is configured to handle URI schemas and can understand information contained in the context-defining URI 132. The context protocol handler 118 can communicate the message containing the information about the application launch and context to receiving component 120 as indicated at 140.

The receiving component 120 can be configured with sufficient privilege on computer 102 to be able to interact with the context management system 122 as indicated at 142. The receiving component 120 can interact with the context management system 122 in order to trigger applications 126(1)-126(N) to securely run as indicated at 144, 146, 148, and 150. The context management system 122 can know if individual applications are already running and as such don't need to be launched. In such cases, the context management system 122 can check with the individual applications to determine if a context change to patient identification number 12345 is acceptable. For instance, application 126(1) might be running and have unsaved data in another context (e.g., for another patient identification number) such that changing contexts would cause the unsaved data to be lost. The context management system 122 can negotiate with application 126(1) to take appropriate action to allow the context change. Once the context management system has resolved any context change issues, the applications can be automatically set to the show information for patient identification 12345. Thus, through a single action by the clinician of clicking the notification link, one or more applications can be automatically launched and set to the patient's context so that the clinician can instantly review the new lab results on his/her computer 102.

As mentioned above, in some implementations the receiving component 120 can also work with the application management component 124 as indicated at 152 to check whether the launch request of the context-defining URI 132 is authorized according to various authorization and/or security parameters.

In one implementation, the receiving component 120 may utilize an application trigger that is a request to the application management component 124 that the application management component start an application configured as part of its settings of the context management system. One such detailed example is described below.

In this example, the context management system 122 can be manifest as Vergence Launchpad® offered by Microsoft® Corporation. An example context-defining URI can be:

launchpad://epic/
?Method=SetContext&itemsName=patient.id.mrn.
clinic|patient.id.mrn.hospital&itemValues=123|456&
LaunchAppFirst=True&ContinueOnFail=False&App
Title=Eureka&AllowContextChangeCancellation=true This context-defining URI tells the "launchpad" component to start the application identified by "epic". Before doing so, launchpad sets two items into the common contextual data that "epic" has access to—two patient IDs, one from a clinic and one from the hospital, so epic knows which patient to view. This not only will allow the epic software to be launched and tuned to a patient by a URI, but that context will be shared by other applications.

In an alternative configuration, the context-defining URI may be a request to start an application context adapter ("bridge") that an administrator has installed, which can start and interact with one or more applications. For instance, the "bridge" protocol handler may be registered to launch a Vergence bridge to interact with an application:

bridge://crm/
?InitiateFollowupWorkflow=true&patient.id.mrn.
hospital=12345

This context-defining URI tells the context management system 122 to launch the "crm" bridge, with a parameter passed to the bridge to tell the CRM system to start a patient follow-up workflow. This illustrates the ability to security launch a more sophisticated local script that can start and control a locally-installed application.

In the above discussion, the context-defining URI 132 is generated remotely from computer 102 and sent to the computer 102. However, such need not be the case. For instance, local application 108 can generate a similar context-defining URI designated at 154. The local application 108 may or may not be one of applications 126(1)-126(N) that are managed by context management system 122 and application management component 124. In this example, local application 108 can generate context-defining URI 154 that can be configured to cause one or more applications to operate under a common context. The context-defining URI 154 can be received by the context protocol handler 118 and handled in a similar manner to that described above relative to context-defining URI 132.

In summary the present applications can provide a secure mechanism to interact with a context management system through the use of a fire-and-forget context-defining URI. As more applications are moving to the web, there are significant disconnects in business workflows because otherwise a web application cannot launch, send data to, or otherwise interact with applications installed on the client workstation or terminal server. This makes the integration of cloud-hosted applications or portals, as an example, much more difficult.

Use Case Examples

Figure 2:
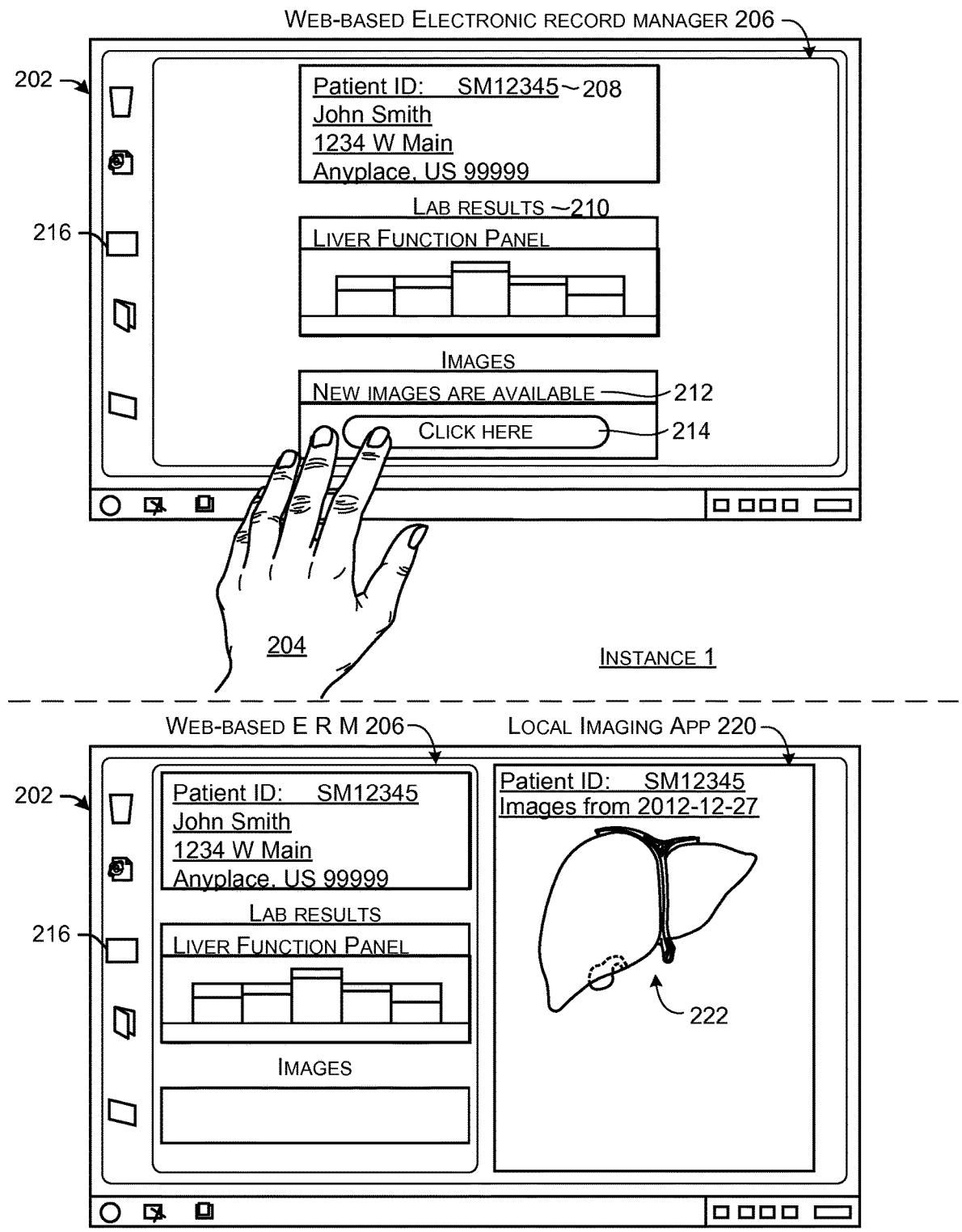
FIGS. 2-3 illustrate examples of use cases for contextually interacting with applications in accordance with some implementations of the present concepts.

FIG. 2 illustrates a use case scenario for contextually interacting with applications. This scenario involves a pad type computer 202, but is applicable to other types of computers. In this scenario, pad type computer 202, belongs to a clinician 204. For purposes of explanation, the scenario is explained via 'instance 1' and a subsequent 'instance 2'. Starting with instance 1, the clinician is using a web-based electronic record manager 206 to review information about an individual patient. In this example, the patient is listed as John Smith with a unique identifier in the form of 'patient ID' as indicated at 208. Further, the web-based electronic record manager 206 is displaying lab results at 210 for the patient. In this example, the lab results relate to a 'liver function panel'. Further, the web-based electronic record manager indicates at 212 that 'new images are available'. In this example, assume that the image viewer is a local application that is installed on the pad-type computer 202. Assume further that the clinician wishes to view the images and taps/touches the 'click here' icon as indicated at 214. (The clinician may alternatively use other selection methods, such as voice or gesture, among others). The 'click here' icon can include, and/or be associated with, a context-defining URI as introduced above relative to FIG. 1, but which need not be evident to the user. Further, the pad type computer 202 can include a URI manager 216 that can manage handling of the context-defining URI.

As evidenced in instance 2, the click by the clinician launched local imaging application 220 that is running on the pad type computer 202. Further, without any effort by the user/clinician, the local imaging application 220 is set to the same context as the web-based electronic records manager 206 (e.g., the local imaging application is displaying the new images for patient ID SM12345). In this example, the new images 222 are from the date 2012-12-27. In this example, the context relates to the patient ID, but this only one example. In another example, the context could relate to patient ID and date so that context is set to show the lab results and the images obtained from the patient on the same day. In summary, a single user action can cause multiple applications to operate in a common context for the user. In this case, one application is a web-application and one is a remote application. However, the present concepts are applicable to other scenarios, such as making multiple local applications operate according to a common context. One such example is described below relative to FIG. 3.

Figure 3:
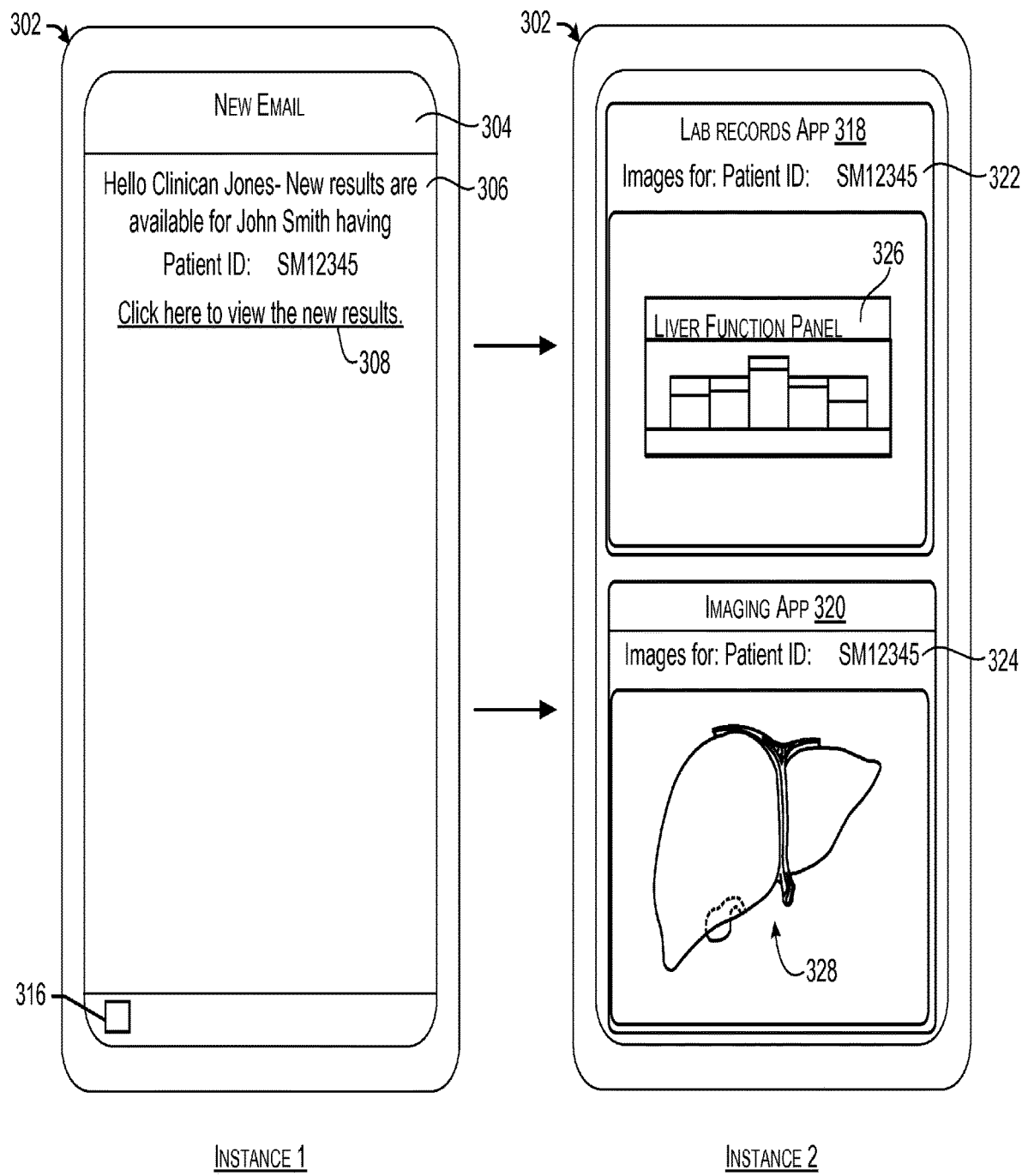

FIG. 3 shows another use case scenario for contextually interacting with applications. This scenario involves a smart phone type computer 302, but is applicable to other types of computers. This scenario continues with the example introduced above relating to a clinician and his/her patient, but of course could relate to other scenarios in the medical context or scenarios outside of the medical context. In this scenario, the clinician receives a notification about the patient via the smart phone type computer 302. In this example, the notification is an email notification 304 received in instance 1. The email indicates at 306 that new results are available for John Smith who has patient ID SM12345. The email also includes a user activatable URI 308 that reads 'click here to view the new results'. Note also that the smart phone type computer 302 can include a URI manager 316 that can manage handling of context-defining URIs as will be evidenced in instance 2. Assume that the clinician activates the user activatable context-defining URI 308.

Instance 2 shows two applications launched on smart phone type computer 302 by the URI manager 316 as a result of the clinician activating context-defining URI 308. In this case, the applications include a lab records application 318 and an imaging application 320. Both applications are set to the context of Patient ID SM12345 as indicated at 322 and 324, respectively. In the case of the lab records application 318, the context causes the application to present a liver function panel 326 for the context defined in the context-defining URI 308 (e.g., patient ID SM12345). In the case of the imaging application 320, the context causes the application to present image 328 for the context defined in the context-defining URI. Accordingly, the clinician can quickly review recent information about his/her patient John Smith (e.g., patient ID SM12345) simply by clicking on the context-defining URI 308 and without any understanding of the context defining elements of the context-defining URI or the functionality provided by the URI manager 316. The clinician simply clicks the context-defining URI and without taking any other actions can view the labs for the patient in the lab records application 318 and the images in the imaging application 320. The URI manager 316 can handle launching the applications and/or changing the context of the applications without causing data loss and cause the context to be displayed in both applications for the clinician. In summary, these use case scenarios can be applied to any other type of user besides a clinician. The present techniques can allow the user, through activation of the context-defining URI to automatically launch one or more applications and to automatically set the context of those applications for the user's convenience.

Method Examples

Figure 4:
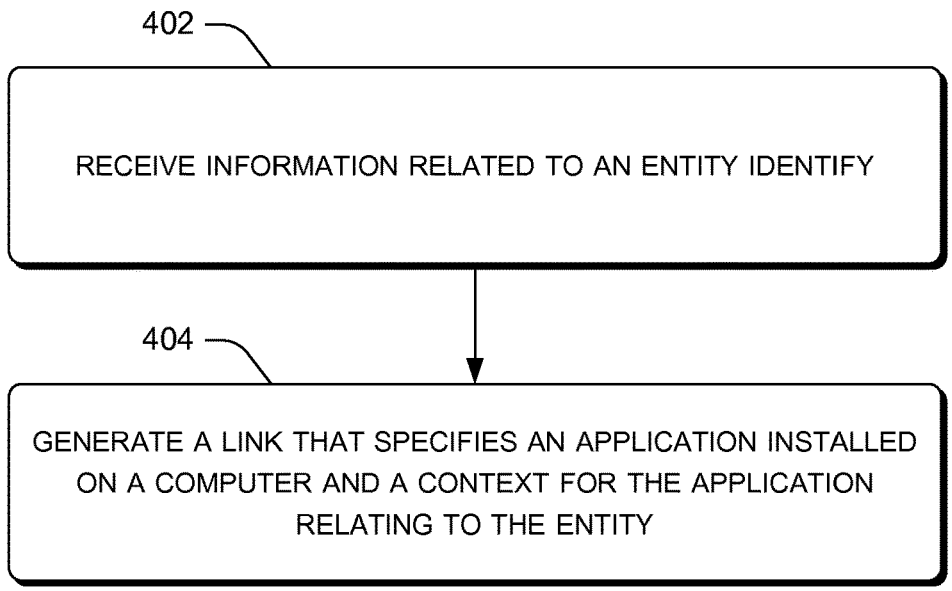
FIGS. 4-5 illustrate examples of flowcharts of methods for contextually interacting with applications in accordance with some implementations of the present concepts.

FIG. 4 illustrates a flowchart of a technique or method 400 for contextually interacting with applications.

At block 402, the method can receive information related to an entity. For instance, the information can be a triggering event related to an entity. In one example described above, the entity can be a patient. In that example when new lab results are obtained, that information can function as a trigger relative to the patient.

At block 404, the method can generate a link that specifies an application installed on a computer and a context for the application relating to the entity. In some implementations, the link can be manifest as a context-defining URI. The context-defining URI can cause the application to run on the computer to present information about the entity (e.g., in this case the patient). The context-defined in the URI can automatically set the application to present data about the entity when the context-defining URI is activated (e.g., the application is set to the context of the entity).

Figure 5:
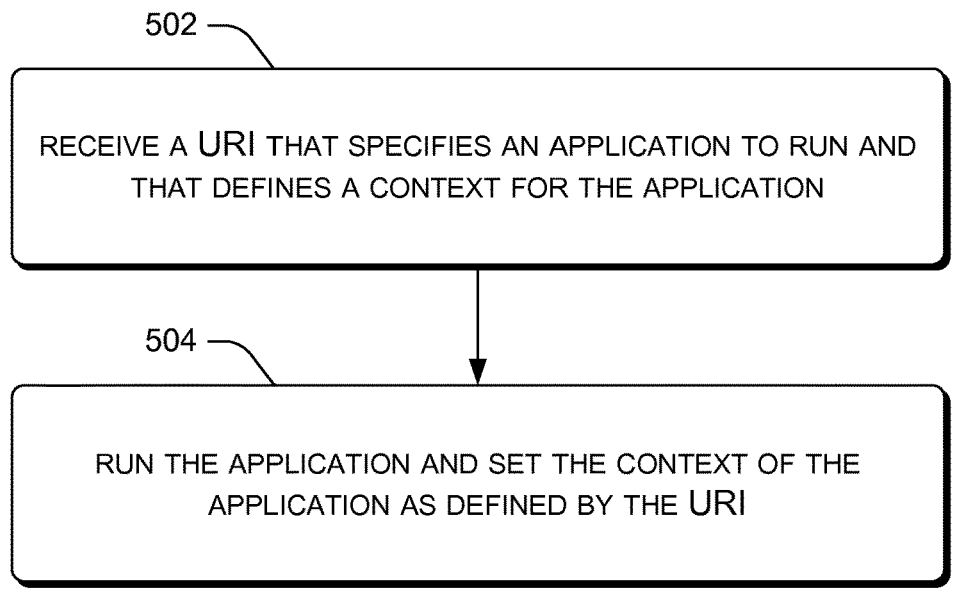

FIG. 5 illustrates a flowchart of a technique or method 500 for contextually interacting with applications.

At block 502, the method can receive a URI that specifies an application to run and that defines a context for the application. In some cases, the URI can be received on a computer upon which the application is installed.

At block 504, the method can run the application and set the context of the application as defined by the URI. In some configurations, the method can determine whether running the application is authorized on the computer. For instance, an administrator of the computer may have manually defined what actions are authorized on the computer and which actions are not authorized. Alternatively or additionally, the administrator may have defined actions which are prohibited on the computer. The method can ensure that only authorized actions are actually implemented. In other implementations, the URI can be examined to determine whether to implement instructions conveyed by the URI. For instance, if the URI contains a valid authorization (e.g., signature) from a trusted source, the URI instructions may be implemented with or without regards to authorizations established for the computer. Stated another way, the authorization accompanying the URI and/or the trustworthiness of the source can be evaluated in determining whether to implement the URI.

In some implementations, the method can check whether the application is already running. If the application is not already running and running the application is authorized, then the application can be launched.

In an instance where the application is already running the method can determine whether setting the context as defined by the URI should be allowed. For instance, if changing the context will cause data loss, then the context change may be delayed. The method can take various actions, such as by negotiating with the application until the context change can be safely made.

The order in which the example methods are described is not intended to be construed as a limitation, and any number of the described blocks or acts can be combined in any order to implement the methods, or alternate methods. Furthermore, the methods can be implemented in any suitable hardware, software, firmware, or combination thereof, such that a computing device can implement the method. In one case, the method is stored on one or more computer-readable storage media as a set of instructions such that execution by a computing device causes the computing device to perform the method.

CONCLUSION

Although techniques, methods, devices, systems, etc., pertaining to contextually interacting with applications are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. At least one computer-readable storage medium having instructions stored thereon that, when executed by a processor, cause the processing device to perform acts, comprising:
    detecting availability of new information related to an entity within a first application; and
    in response to detecting the availability of the new information related to the entity within the first application, generating a selectable link that identifies the first application, a second application storing additional information related to the entity, and an identifier of the entity,
    wherein, in response to a user selecting the selectable link, the first application is automatically launched and automatically set, using the identifier of the entity identified in the selectable link, to present the new information related to the entity to the user, and
    the second application is automatically launched and automatically set, using the identifier of the entity included in the selectable link, to present the additional information associated with the entity to the user according to the shared context.

2. The computer-readable storage medium of claim 1, wherein the detecting availability of the new information includes detecting a triggering event.

3. The computer-readable storage medium of claim 1, wherein the generating a link comprises generating a universal resource identifier (URI).

4. The computer-readable storage medium of claim 1, further comprising sending the selectable link to a computer transmitting the new information related to the entity.

5. The computer-readable storage medium of claim 1, embodied as a computer-readable storage device that is included on a remote computer that also includes the processor.

6. A method performed by a computing device, the method comprising:
- detecting a triggering event indicating availability of new information related to an entity within a first application;
- in response to detecting the triggering event, generating a selectable link that identifies the first application, a second application storing additional information related to the entity, and an identifier of the entity; and
- using the selectable link, in response to a user selecting the selectable link, to cause the first application to automatically launch and automatically set, using the identifier of the entity identified in the selectable link, to present the new information associated with the entity to the user, and
- the second application to automatically launch and automatically set, using the identifier of the entity identified in the selectable link, to present the additional information associated with the entity to the user.

7. The method of claim 6, wherein the using comprises sending the link over a network to another computing device that executes at least one of the first application or the second application.

8. The method of claim 6, wherein at least one of the first application or the second application executes on the computing device.

9. The method of claim 6, wherein the link comprises a universal resource identifier (URI).

10. The method of claim 6, wherein the link identifies the first application by including an identifier of the first application after a colon symbol in the URI.

\* \* \* \* \*